Figure 1:
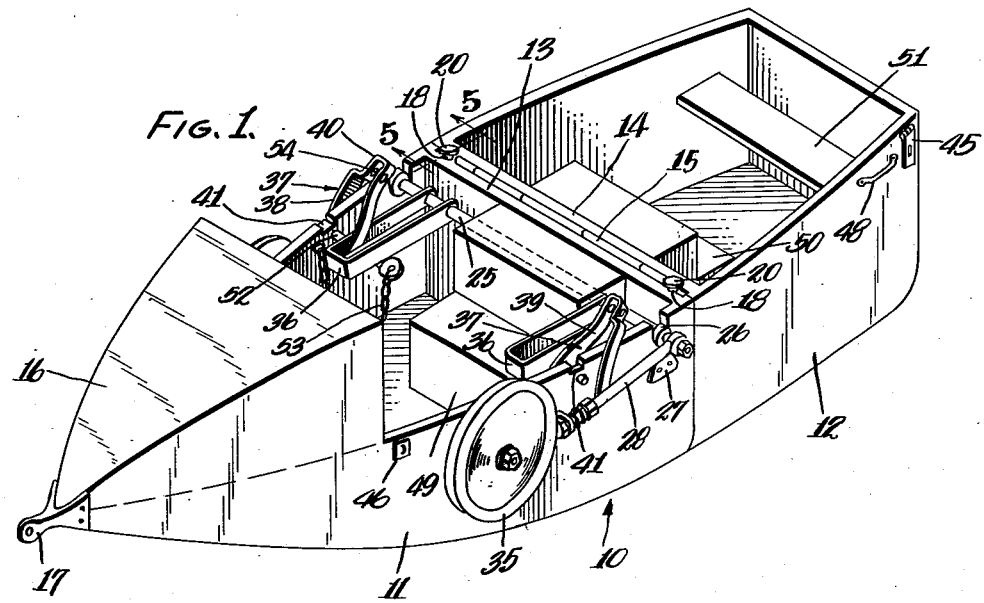

Oct. 9, 1951  C. A. DAVIS  2,570,528
TRAILER BOAT CONSTRUCTION
Filed March 11, 1947  2 Sheets-Sheet 1

INVENTOR.
CASPER A. DAVIS
BY
Michael Williams
ATTORNEY

Oct. 9, 1951    C. A. DAVIS    2,570,528
TRAILER BOAT CONSTRUCTION
Filed March 11, 1947    2 Sheets-Sheet 2
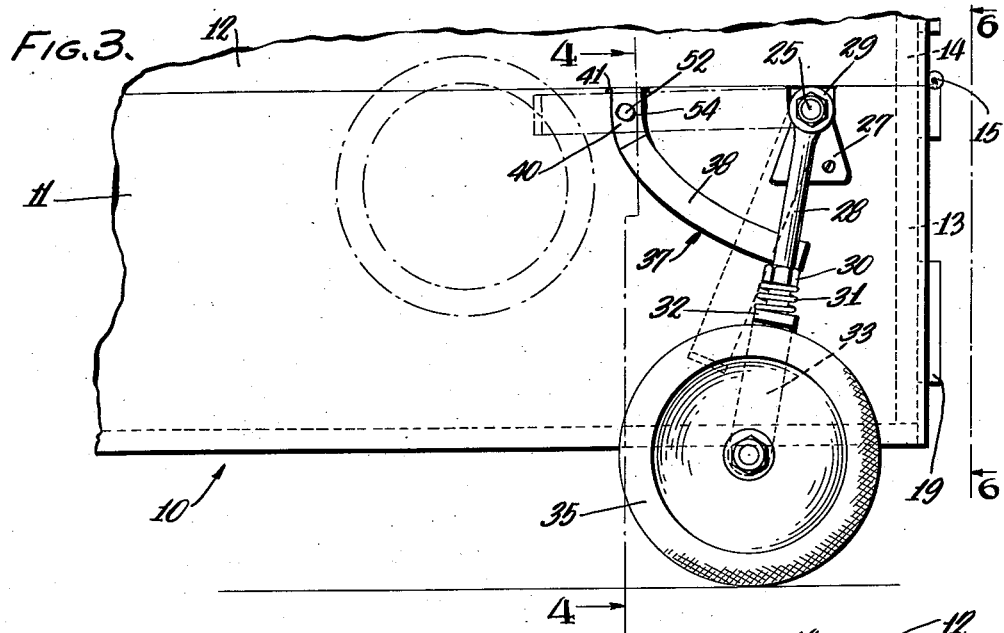
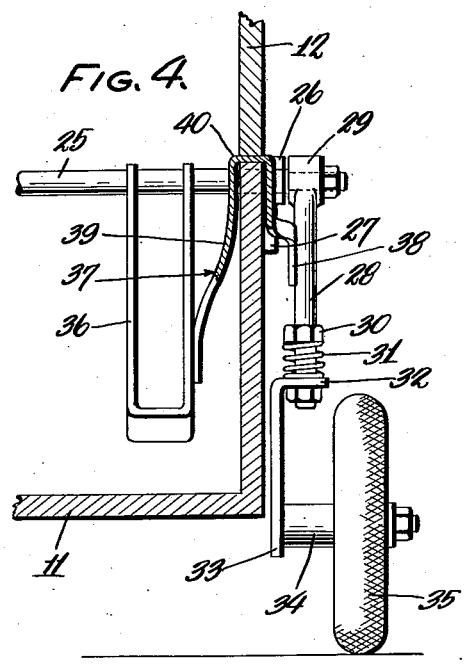
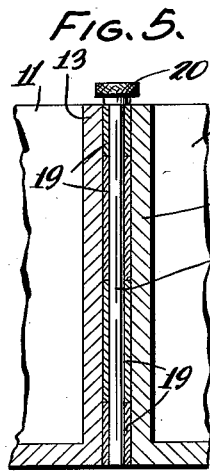
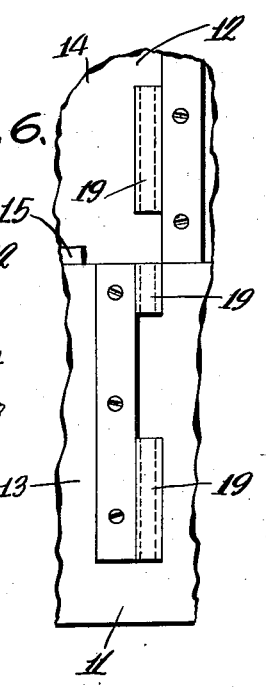
INVENTOR.
CASPER A. DAVIS
BY
Michael Williams
ATTORNEY Patented Oct. 9, 1951

2,570,528

UNITED STATES PATENT OFFICE 2,570,528

TRAILER BOAT CONSTRUCTION

Casper A. Davis, Warren, Ohio

Application March 11, 1947, Serial No. 733,785

4 Claims. (Cl. 9—1)

1

My invention relates to boat constructions, more particularly to combination boat and trailer constructions, and the principal object of my invention is to provide new and improved constructions of this character.

Prior attempts have been made to provide a combined boat and trailer construction, but such attempts have failed, largely because although the construction appeared theoretically feasible, from practical viewpoints the construction was expensive to manufacture and difficult and unreliable in operation.

My invention provides a constuction that may be readily changed from boat forming relation to trailer forming relation, and vice versa, with little effort, largely because component parts of the construction have been carefully proportioned for such purpose. Further, the supporting wheels of my invention are so constructed and arranged that they may be easily moved from one position to another, and in road engaging relation, the wheel means are positively locked in position and adequately braced to accommodate all road conditions.

Figure 2:
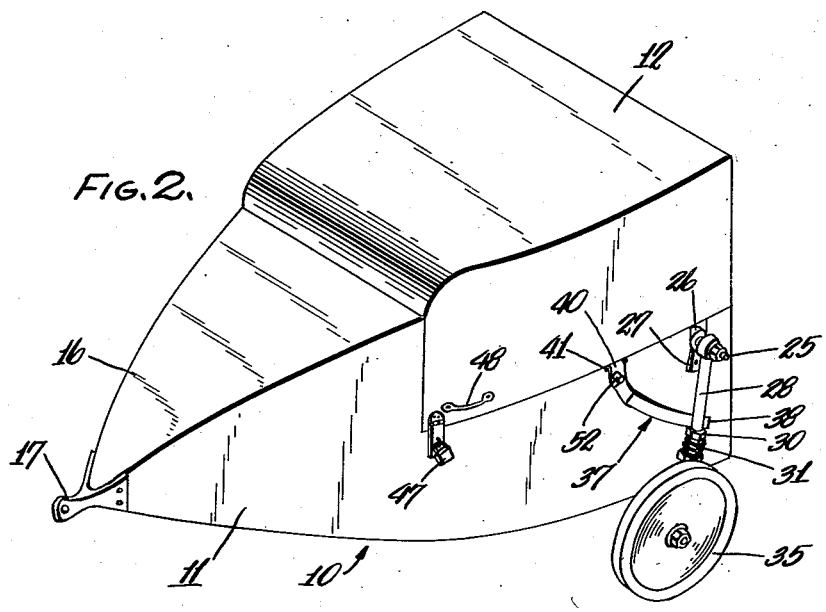

In the drawings accompanying this specification and forming part of this application, there is shown, for purposes of illustration, an embodiment which my invention may assume, and in these drawings:

Figure 1 is a perspective view disclosing the embodiment chosen to illustrate the invention, with parts in boat forming relation, Figure 2 is a perspective view showing the parts in trailer forming relation, Figure 3 is a fragmentary elevational view, disclosing details of construction, Figure 4 is a fragmentary sectional view corresponding generally to the line 4—4 of Figure 3, Figure 5 is a fragmentary sectional view corresponding generally to the line 5—5 of Figure 1, Figure 6 is a fragmentary elevational view, showing construction as viewed from line 6—6 of Figure 3.

Referring particularly to Figure 1, the embodiment therein disclosed comprises body means 10, formed of a plurality of sections, in this case two sections 11 and 12. Each section provides a watertight vessel, sufficient in itself to form a floating unit. The sections 11 and 12 are adapted to be disposed in in-line relation, as shown in Figure 1, to form a boat, or in position wherein one section is carried by the other to form a trailer, as shown in Figure 2.

The stern portion 13 of the section 11 and the forward portion 14 of the section 12 are hinged

2 together, as by means of the hinge 15, which in this case connects the top edges of the portions 13 and 14. Therefore, the section 12 may be swung to position atop the section 11, as seen in Figure 2.

As clearly shown in Figures 1 and 2, the section 11 is longer than the section 12, so that the latter section is comparatively light and may be moved easily from one position to another. Starting from the bow and extending inwardly, the section 11 is formed with a super-structure 16, which if desired, may be made removable from the section 11, as suggested by the dash lines in Figure 1. The super-structure 16 may be used for storage purposes, or for any other purpose desired. The lower surface of the stern of the section 12 is suitably formed so that when this section is carried by the section 11, a smooth stream-lined exterior surface is provided, as best seen in Figure 2. The bow of the boat may be provided with any suitable means, such as the eye bracket 17, for purpose of towing the structure comprising the boat or trailer.

To prevent the sections 11 and 12 from swinging relatively, when in boat forming relation, the embodiment of the invention provides a pair of rods 18 fitting in aligned loops 19 carried by the rear and forward ends of the sections 11 and 12 respectively. The loops 19 on respective sections interfit, as shown in Fgure 5, when such sections are in boat forming relation, to receive a respective one of the rods 18. Each of the rods is provided with a headed portion 20 to facilitate insertion and removal of the rod. The rods may be carried within the trailer, when the sections 11, 12 are in trailer forming relation.

Wheel means are provided for supporting the construction when the sections are in trailer forming relation, the wheel means being so constructed and arranged as to be locked in road engaging position when the sections are in trailer forming relation.

As herein disclosed, the wheel means comprises an axle 25 extending transversely of the section 11 near its stern portion 13, the axle being supported by bearings 26 fitting within notches formed in the sides of the section 11, as clearly shown in Figure 1, the bearings 26 being carried by plates 27 fastened to respective sides of the section 11.

Carried by respective ends of the axle 25 are rods 28 (see especially Figure 4), having head portions 29 clamped to the axle 25. Each rod 28 has a threaded free end, on which is threaded an abutment, such as the nut 30. One end of a coil spring 31 bears against the nut 30, its other end bearing against an angle portion 32 of a wheel carrying bracket 33. The bracket 33 provides a bearing 34 for a wheel 35 of any suitable type. Thus, it will be seen that each wheel is provided with means for absorbing shock which would otherwise be transmitted to the trailer.

In the embodiment shown, the means for effecting swinging movement of the axle 25, and consequent movement of the wheel means, comprises a pair of arms 36, each in the form of a sheet metal bracket bent into the shape of a U, the legs of the U being welded or otherwise suitably secured to the axle 25. As clearly seen in Figure 1, the wheel carrying rods 28 are disposed exteriorly of the section 11, while the arms 36 are disposed interiorly of the section 11. Brackets 37 straddle the sides of the section 11, each bracket comprising a leg 38 welded or otherwise secured to a respective wheel supporting rod 28, and a leg 39 welded or otherwise secured to a respective arm 36. The brackets 37 further connect the wheel supporting rods 28 for rotation with the axle 25, and also provide a brace for such rods when in lowered position, as clearly seen in Figure 2.

Each of the brackets 37 has a restricted portion 40 adapted to closely fit around the top edge of the section 11 when the wheel means is in lowered position. The top edge of each side of the section 11 is formed with a notch 41 for receiving the traversing part of a respective restricted portion, as seen in Figures 2 and 3. Thus, when the section 12 is folded upon the section 11, the adjoining surfaces of the side margins of the section 12 bear against the traversing parts of respective restricted portions of the brackets 37, to lock the wheel means in trailer supporting relation.

The section 12 may be provided with a hasp 45 adapted to engage with a staple 46 carried by section 11, so that a padlock 47 may lock the sections 11, 12 in trailer forming relation. The section 12 may also be provided with handles 48 to enable a user to easily move this section from one position to another.

As best seen in Figure 1, the sections 11, 12 may be provided with steps 49, 50 respectively, to provide for easy movement from one section to another. The steps also provide suitable seats for occupants of the boat, the steps being contained out of sight when the sections are in trailer-forming relation. The step 49 may also conceal part of the axle 25. If desired, the section 12 may also be provided with a seat 51 in the stern portion of the section 12.

To maintain the wheel means in elevated position, pins 52 may be fitted within apertures in the side walls of the section 11, the body of the pins bearing against the underside of the arms 36. To keep the pins from being misplaced, each of the pins may be carried by a chain 53 secured to an adjacent side of the section 11. The pins 52 may further insure that the wheel means is held in trailer-supporting relation. For this purpose, each of the restricted portions 40 of the brackets 37 is provided with aligned apertures 54, so that each of the pins 52 may pass through the aligned apertures and fit within the respective aperture in the side of the section 11. In this connection, the pins 52 also maintain the wheel means in lowered position, in the event that it is desired to transport the sections 11, 12 when they are in boat forming relation.

It will be apparent that the embodiment herein disclosed is subject to considerable modifications. For example, instead of the means herein shown for effecting rotation of the axle 25, this axle may be rotated by fluid cylinders, or by any other suitable means.

From the foregoing, it will be apparent to those skilled in the art that I have accomplished at least the principal object of my invention, and it also will be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. A boat construction, comprising: body means; wheel means, carried by said body means movable to different positions, in one position being adapted to engage a road surface, and in another position being clear of the road surface and generally clear of the water in which the boat is floating, said wheel means comprising wheel supporting members, axle means extending generally transversely of said body means, handle means for rotating said axle means, and brace means connecting said axle means and said wheel supporting members, said brace means being configured to engage the top surface of respective sides of said body when said wheel means are in road engaging position.

2. A combined boat and trailer construction, comprising: a pair of water-tight sections hinged together and adapted to be disposed in in-line relation to form a boat, and foldable one on the other to form a trailer; wheel means carried by one of said sections, movable from a road engaging position to a position clear of the road, said wheel means comprising wheel supporting members, axle means extending generally transversely of said body means, handle means for rotating said axle means, and brace means connecting said axle means and said wheel supporting members, said brace means being so configured that a portion thereof is disposed between adjoining marginal surfaces of said sections when they are in folded relation.

3. A boat construction, comprising: body means; wheel means carried by said body means and movable to different positions, in one position being adapted to engage a road surface, and in another position being clear of the road surface and generally clear of the water in the event the boat is in water, said wheel means comprising wheel supporting members, axle means extending transversely of said body means and connected to said wheel supporting members, and brace means connecting said axle means and said wheel supporting members, said brace means being bent to provide portions engageable with the top surface of respective sides of said body when said wheel means is in road engaging position.

4. A boat construction, comprising: a boat body, wheel means carried by said body and movable to different positions, in one position being adapted to engage a road surface and in another position being clear of the road surface, said wheel means comprising a pair of wheels disposed at opposite exterior sides of said body, rotatable axle means extending generally transversely of said body, a pair of wheel supporting members connected to said axle means and each carrying a respective wheel, and a pair of brace means connecting respective wheel supporting members in braced relation with said axle means, each of said brace means comprising a first portion movable along an exterior side of the body and connectable to a respective wheel supporting member at a point spaced from said axle means and a second portion disposed at the interior side of said body and connected to an adjacent portion of said axle means, each brace means having a portion intermediate said first and second portions and adapted to engage with an adjacent part of the top surface of said body when said wheel means is in road surface engaging position.

CASPER A. DAVIS.

REFERENCES CITED

The following references are of record in the file of this patent:

UNITED STATES PATENTS

| Number | Name | Date |
|---|---|---|
| 780,835 | Such | Jan. 24, 1905 |
| 1,560,983 | Gibbs et al. | Nov. 10, 1925 |
| 1,692,208 | Hallock | Nov. 20, 1928 |
| 2,256,038 | Woodruff | Sept. 16, 1941 |
| 2,260,676 | Lafaye | Oct. 28, 1941 |
| 2,370,508 | Wilkie | Feb. 27, 1945 |
| 2,437,736 | Good | Mar. 16, 1948 |
| 2,457,567 | Kuns | Dec. 28, 1948 |

FOREIGN PATENTS

| Number | Country | Date |
|---|---|---|
| 28,809/30 | Australia | Sept. 3, 1930 |